United States Patent [19]

Matsuzawa et al.

[11] Patent Number: 5,257,801
[45] Date of Patent: Nov. 2, 1993

[54] INDEPENDENT WHEEL SUSPENSION APPARATUS FOR VEHICLE

[75] Inventors: Atsushi Matsuzawa; Kunihiko Hidaka; Atsushi Enomoto; Shinji Kawano, all of Yokohama, Japan

[73] Assignee: Yorozu Corporation, Kanagawa, Japan

[21] Appl. No.: 846,466

[22] Filed: Mar. 4, 1992

[30] Foreign Application Priority Data

Mar. 8, 1991 [JP] Japan .................. 3-13040[U]
Feb. 26, 1992 [JP] Japan ..................... 4-39698

[51] Int. Cl.⁵ ............................................. B60G 3/00
[52] U.S. Cl. .................................... 280/691; 280/675
[58] Field of Search ............... 280/691, 661, 673, 674, 280/675, 660, 688, 690

[56] References Cited

U.S. PATENT DOCUMENTS 4,685,690 8/1987 Fujita et al. ................. 280/692 X

FOREIGN PATENT DOCUMENTS 62-189211 12/1987 Japan .
3-186410 8/1991 Japan .
3-193513 8/1991 Japan .................................. 280/691

Primary Examiner—Margaret A. Focarino
Assistant Examiner—Paul Dickson
Attorney, Agent, or Firm—Mathews, Woodbridge & Collins

[57] ABSTRACT

An independent suspension provided with a knuckle for rotatably supporting a wheel thereon and a sub-knuckle member pivotally supported on the knuckle, the knuckle connected to the leading terminal of a lower arm through a first ball joint and the basal terminal part of the lower arm is attached to an automobile body. The leading terminal of an upper arm is connected to the sub-knuckle member through a second ball joint and the basal terminal part of the upper arm is attached to the automobile body side. The leading terminal of a control link attached to the automobile body side is connected to the knuckle member through a third ball joint. The axis which passes the centers of the first ball joint and the second ball joint constitutes itself a steering axis. The center of the third ball joint is offset relative to the point of intersection between the horizontal plane passing the third ball joint and the steering axis. As a result, the knuckle members are allowed to produce a swinging motion around the second ball joint as the center to change the camber angle of the wheel while the automobile body is being steered.

15 Claims, 15 Drawing Sheets

FRONT

FIG. 13A OFFSET TYPE A
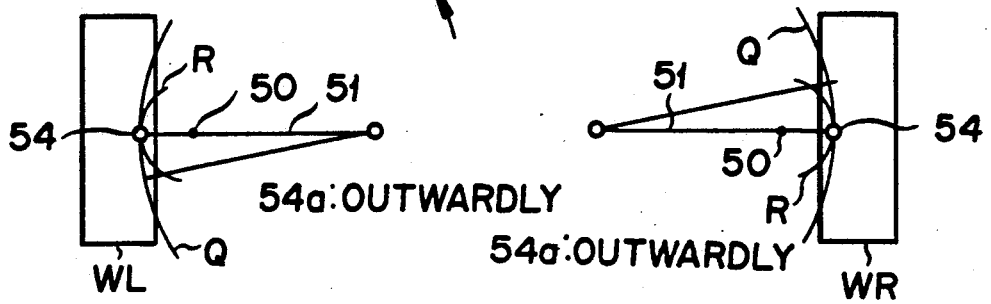
FIG. 13B OFFSET TYPE B
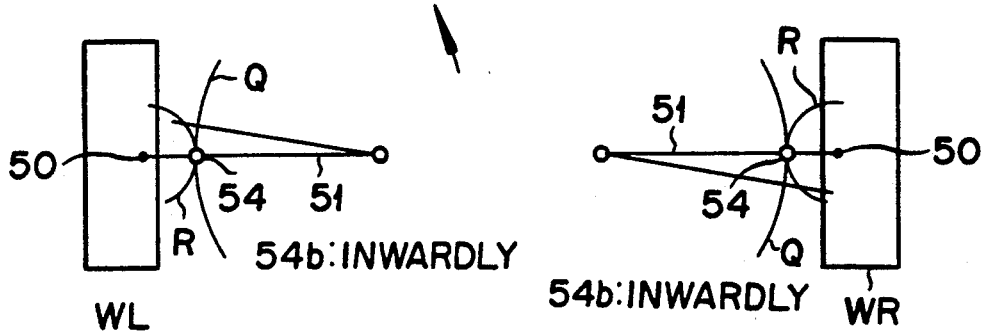
FIG. 13C OFFSET TYPE C
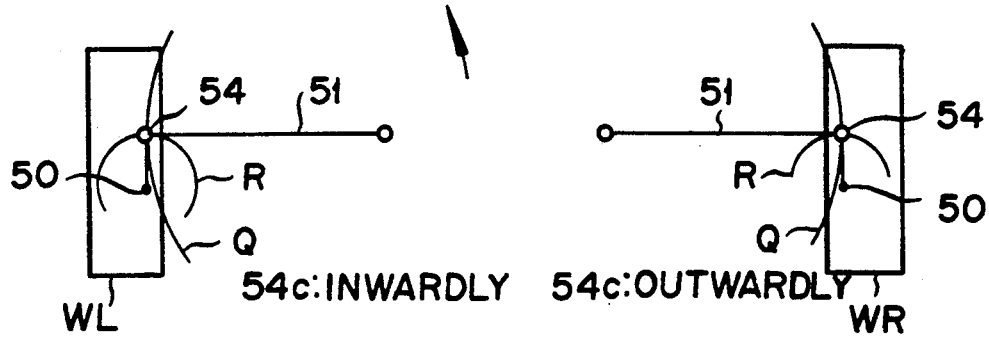
FIG. 13D OFFSET TYPE D
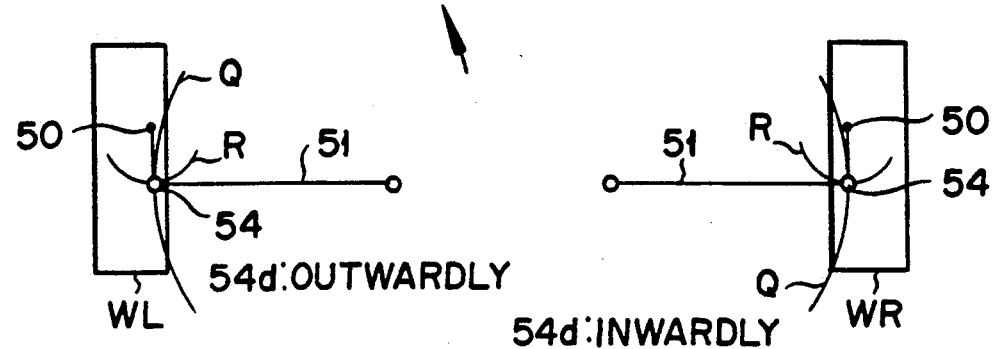

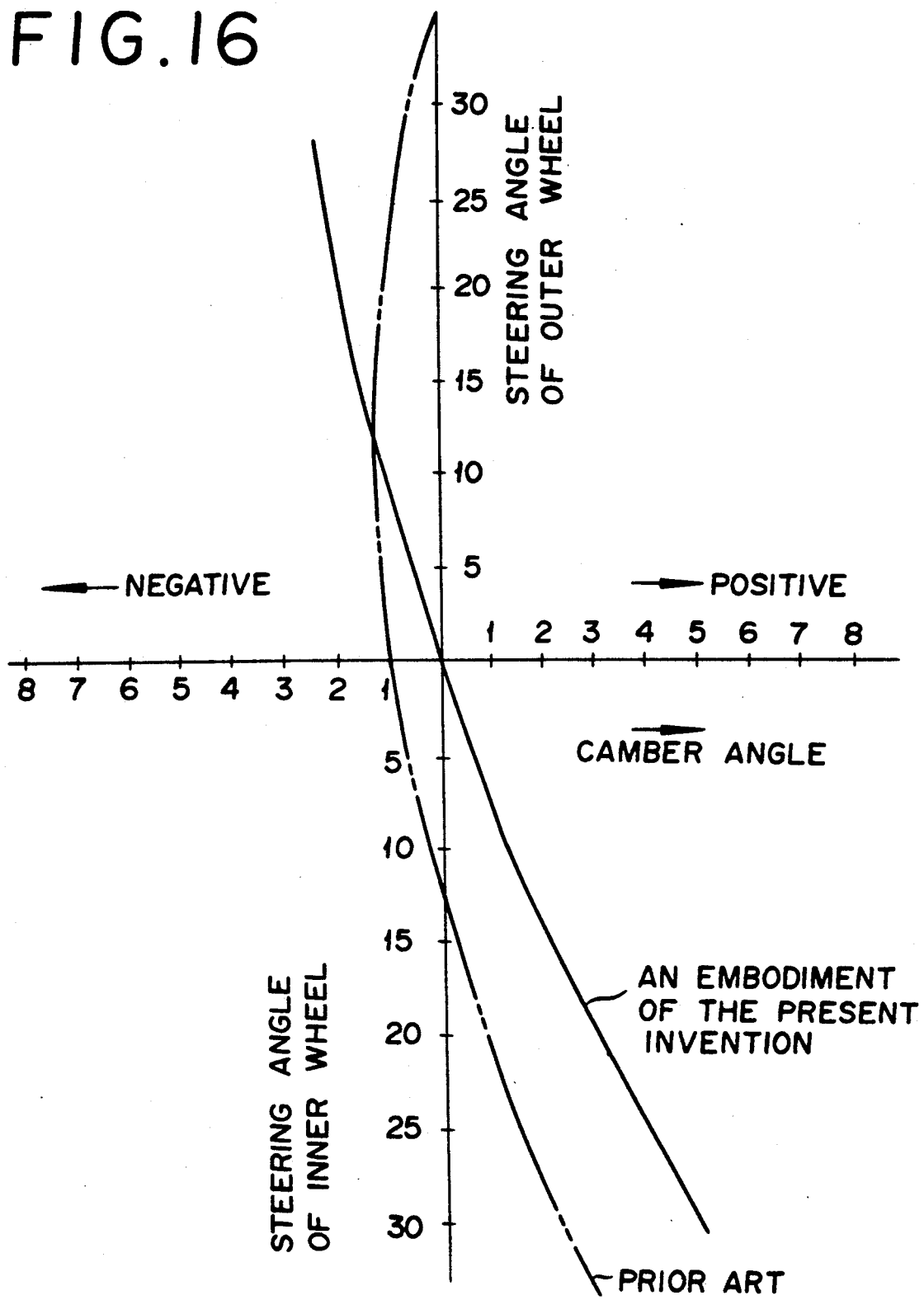

1

INDEPENDENT WHEEL SUSPENSION APPARATUS FOR VEHICLE

BACKGROUND OF THE INVENTION

1. Field of the Invention

This invention relates to an independent wheel suspension apparatus for use mainly in the front wheels of an automobile and more particularly to a wishbone type independent suspension apparatus.

2. Description of the Prior Art

For an automobile in motion to absorb various vibrations and shocks inflicted thereon by the road surface, a suspension endowed with a shock-absorbing ability is interposed between the body and the axles of the automobile. The suspension of this nature fulfills such important roles as supporting the automobile on the road surface, transmitting the propelling force from the driving wheels to the automobile side, simultaneously moderating the shocks from the road surface and protecting the automobile against breakage, and improving the ride and the stability of motion as well. The trend of automobiles toward the improvement of speed has been urging increasingly profound recognition of the performance of the suspension as a factor for governing the limit of speed improvement. Scientific studies have been being promoted concerning the suspension system as a whole, achieving success in developing a host of types of mechanisms and elements.

The suspension generally needs to produce soft motions in the vertical directions and hard motions in the longitudinal and lateral directions. In terms of construction, the suspensions may be classified broadly under the two types, axle suspensions and independent suspensions. While the axle suspensions are generally used in the front and rear wheels of trucks and in the rear wheels of passenger cars, the independent suspensions are prevalently used in the front and rear wheels of passenger cars which attach great importance to comfort of the ride and stability of the motion.

The independent suspensions allow the laterally opposite wheels to produce motions independently of each other instead of interconnecting them with one axle. In terms of construction, these independent suspensions may be classified under the wishbone type, the McPherson type, the trailing arm type, and the swing axle type. These independent suspensions, as compared with the axle suspensions, have the advantage that when either of the laterally opposite wheels rides on a projection from the road surface, they act like human knee joints, allow only the affected wheel to produce a vertical motion, keep the automobile body from inclination, curb the possible rolling, and ensure stability of the automobile motion.

Among other independent suspensions cited above, the wishbone type suspension has found veritably popular utility. This wishbone type suspension is characterized in that since a link mechanism using two horizontally parallel separate arms produces parallelogrammatic motions, the wheels produce substantially vertical motions and, as a result, the tires on the wheels always keep a horizontal contact with the road surface and enjoy ideal ground contact. It nevertheless has many problems such as heavy weight and high cost due to the complication of construction as compared with the McPherson type suspension and reduction in inner volume of the engine room due to the inevitable intrusion of the two arms into the engine room. It has come to attract growing attention on account of the merits of robustness of build and excellent stability in rotary motion.

The wishbone type independent suspension is provided with two separated horizontal arms resembling a furcula of the breastbone in a chicken (wishbone) and has knuckles thereof attached by these arms to the automobile body or the frame thereof. The basal terminals severally of these arms are pivotally supported on the automobile body side and the leading terminals thereof are connected to the upper and lower terminals of the knuckles generally through the medium of a ball joint. As a result, the two separated horizontal arms and the knuckles jointly form a link mechanism. In addition to the wishbone type suspension which has both the two arms formed in the shape of the letter A, a modified version which has a lower arm not formed in the shape of the letter A but adapted to rely on a tension rod for compensation of the motion thereof produced in the longitudinal directions has been known to the art. This modified type is referred to as the I type arm.

In the wishbone type independent suspension disclosed in Japanese Unexamined Utility Model Publication No. 62-189,211, for example, the socket of a ball joint serving to interconnect an upper arm and a knuckle is rotatably attached to the leading terminal of the upper arm through the medium of a pivot shaft. Then, on the leading terminal of a boss part protruding upwardly from this socket, a sub-upper arm is supported by means of a pivot shaft. Owing to this construction, the suspension is enabled by the upper arm to follow the vertical strockes of the wheel.

This suspension, while enjoying improved characteristic of change in camber angle due to the vertical motions of the wheel and enhanced stability of a straight motion, requires to decrease the angle of inclination of a kingpin and increase the angle of a castor for the purpose of conferring an angle of negative camber on the outer wheel during a rotation of the vehicle thereby satisfactorily improving the stability of a rotary motion. A reduction in the angle of inclination of the kingpin results in an addition to the radius of scrub and an increase in the angle of castor results in an excessive addition to the castor trail. These disadvantages have prevented the suspension from acquiring generous negative camber.

SUMMARY OF THE INVENTION

This invention, conceived in the urge to eliminate the problems encountered by the prior art as described above, has as an object thereof the provision of an independent suspension which allows the characteristic of change in camber angle to be set so as to suit the condition of an automobile without necessitating any change in the angle of castor or the angle of inclination of a kingpin.

Another object of this invention is to provide an independent suspension which enjoys notably enhanced freedom of design and allows impartation of outstanding stability of motion to the automobile.

In accordance with the present invention, there is provided an independent suspension apparatus, comprising a knuckle for rotatably supporting a wheel thereon, a lower arm having the leading terminal part thereof connected to the lower terminal part of said knuckle through the medium of a first ball joint and the basal terminal part thereof attached to an automobile body, a sub-knuckle member pivotally supported on the upper terminal part of said knuckle through the medium of a pin extended in the longitudinal direction of said automobile body, an upper arm having the leading terminal part thereof connected to said sub-knuckle member through the medium of a second ball joint and the basal terminal part thereof attached to said automobile body and positioned above said lower arm, and a control link having the leading terminal part thereof connected to said sub-knuckle member through the medium of a third ball joint and the basal terminal part thereof attached to said automobile body, whereby an axis passing the center of said first ball joint and the center of said second ball joint constitutes itself a steering axis of said knuckle while said wheel is producing a steering motion and the leading terminals of said lower arm, said upper arm, and said control link are enabled to rotate in the vertical directions while said wheel is in motion in the vertical direction.

The center of said third ball joint is offset relative to the steering point constituting the point of intersection between a horizontal plane passing the center of said third ball joint interconnecting said sub-knuckle member and said control link and said steering axis and, whereby, the rotational motions produced around said steering axis by said knuckle and said sub-knuckle member while said automobile is being steered are transformed via a swinging motion of said sub-knuckle member around said second ball joint as the center into a swinging motion of said knuckle around said first ball joint as the center.

Further in accordance with the present invention, there is provided an independent suspension apparatus, comprising a knuckle for rotatably supporting a wheel thereon, a sub-knuckle member pivotally supported on the upper terminal part of said knuckle through the medium of a pin extended in the longitudinal direction of an automobile body and adapted to swing freely relative to said knuckle, a lower arm connected to said knuckle through the medium of a first ball joint and adapted to attach said knuckle vertically rotatably to said automobile body, an upper arm connected to said sub-knuckle member through the medium of a second ball joint and adapted to attach said sub-knuckle member vertically rotatably to said automobile body, and a control link connected to said sub-knuckle member through the medium of a third ball joint having the center thereof at a position parted from a steering axis formed by the center of said first ball joint and the center of said second ball joint and adapted to attach said sub-knuckle member vertically rotatably to said automobile body, whereby said third ball joint is offset in the horizontal direction when said knuckle and said sub-knuckle member are rotated around said steering axis while said automobile is being steered and said knuckle and said sub-knuckle member are relatively swung around said pivot to change the camber angle while said automobile is being steered.

In this invention, in the decision of the geometry of a suspension apparatus, free choice of the combination of an offset type with an array type brings about a notable improvement in the freedom of design and allows acquisition of a desired characteristic of change in camber angle.

BRIEF DESCRIPTION OF THE DRAWINGS

FIG. 13A is a schematic view illustrating both inner and outer wheels shifted outwardly.

FIG. 13B is a schematic view illustrating both inner and outer wheels shifted inwardly.

FIG. 13C is a schematic view illustrating outer wheel shifted outwardly and inner wheel shifted inwardly.

FIG. 13D is a schematic view illustrating outer wheel shifted inwardly and inner wheel shifted outwardly.

FIG. 16 is a graph showing the change in camber angle relative to the angle of steering of the inner and outer wheels of an independent suspension as one embodiment of this invention.

DESCRIPTION OF THE PREFERRED EMBODIMENTS

The independent suspension apparatus of this invention for a vehicle is used for supporting mainly the laterally opposite front wheels in the four wheels of a four-wheeled vehicle.

Figure 1:
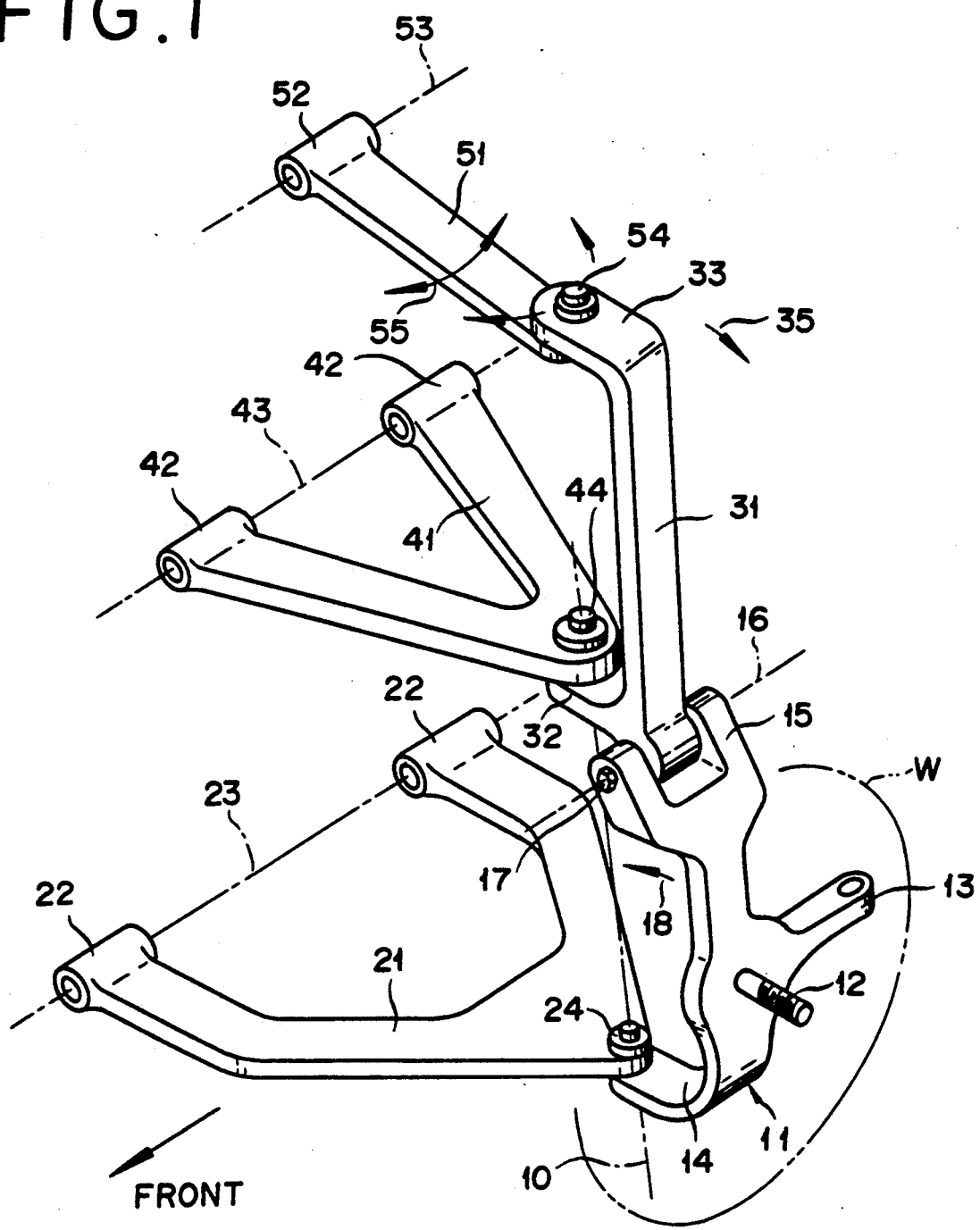
FIG. 1 is a perspective view illustrating an independent suspension embodying this invention for supporting a front-left wheel.
Figure 2:
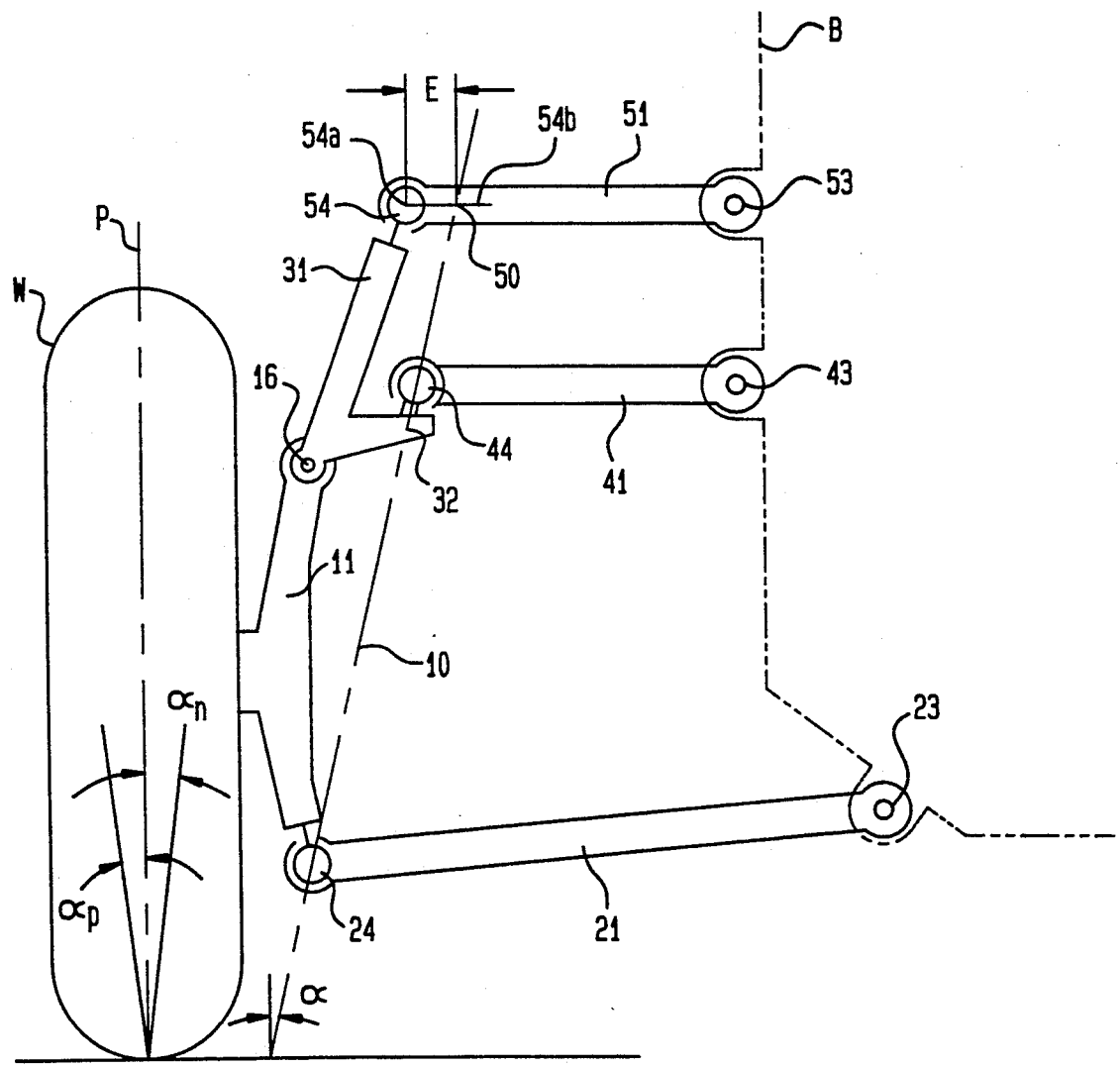
FIG. 2 is a schematic diagram of the suspension of FIG. 1 as viewed from behind an automobile body.

FIG. 1 and FIG. 2 illustrate a suspension apparatus for supporting the front-left wheel. The rightside front wheel is supported by a similar apparatus. From a knuckle 11 which is rotatably attached to a wheel W, a spindle 12 for supporting the wheel W through the medium of a bearing (not shown) is projected outwardly. From the knuckle 11, a knuckle arm 13 is projected in the direction of the rear part of the automobile body. This knuckle arm 13 is adapted so as to allow connection thereto of a steering mechanism and permit a suitable change in the angle of steering of the wheel W. To the lower terminal part 14 of the knuckle 11, a lower arm 21 is connected through the medium of a first ball joint 24. This lower arm 21 is a so-called A type arm. A connecting bush 22 formed at the basal terminal part of this lower arm 21 is pivotally attached to the automobile body B. The lower arm 21 is rotated around a axis 23 which is extended in the longitudinal direction of the automobile body.

On a yoke part 15 formed in the upper terminal part of the knuckle 11, a sub-knuckle member 31 is pivotally supported through the medium of a pivot 17 laid in the longitudinal direction of the automobile body. The sub-knuckle member 31 and the knuckle 11 mutually rotate around a connecting axis 16 as the center. The leading terminal of an upper arm 41 is connected through the medium of a second ball joint 44 to a connecting part 32 integrally projected inwardly from the lower terminal part of the sub-knuckle 31. This upper arm 41 is also an A type arm. A connecting bush 42 formed in the basal terminal part of the upper arm 41 is pivotally supported on the automobile body B. The upper arm 41 is rotated around an axis 43 as the center. The ball joint 44 is positioned above the connecting axis 16.

To the upper terminal part 33 of the sub-knuckle member 31, a control link 51 is connected through the medium of a ball joint 54. The control link 51 is provided integrally in the basal terminal part thereof with a bush 52. The control link 51 is pivotally supported on the automobile body B through the medium of a member (not shown) made of rubber and incorporated in the bush 52. The control link 51 is rotated around a axis 53. Further, this control link 51 is displaced in the direction indicated by an arrow 55 within the range in which the incorporated rubber-made member is allowed to produce an elastic deformation of itself.

When the wheel W is steered by the steering mechanism, the knuckle 11 and the sub-knuckle member 31 are rotated around a steering axis 10 which passes through the center of the ball joint 24 of the lower arm 21 and the center of the ball joint 44 of the upper arm 41. This steering axis 10 is inclined by a prescribed angle of castor in the longitudinal direction of the automobile body and, at the same time, inclined by a prescribed angle $\alpha$ of inclination of the kingpin relative to the axis perpendicular to the ground in the direction of the width of the automobile body as illustrated in FIG. 2. FIG. 2 is a diagram of the apparatus as viewed from behind the automobile body. This diagram depicts a case in which the wheel center plane P assumes a position perpendicular to the ground. The wheel W assumes a negative camber angle $\gamma n$ when the wheel center plane P is inclined in the direction of approaching the automobile body relative to the point of contact. It assumes a positive camber angle $\gamma p$ when the wheel center plane P is inclined in the direction of parting outwardly toward the automobile body relative to the point of contact.

The ball joint 54 has a well-known construction and comprises a ball attached to either of the sub-knuckle member 31 and the control link 51 and a socket attached to the remainder of the two parts just mentioned and adapted to accommodate the ball. The sub-knuckle member 31 and the control link 51 are mutually rotated in a desired direction. The other ball joints have the same construction as described above.

When the point of intersection between the horizontal plane passing the ball center 54a of the ball joint 54 and the steering axis 10 is taken as a steering point 50 as illustrated in FIG. 2, the center point 54a of the ball joint 54 is offset by a distance E toward the outside of the automobile body B relative to the steering point 50. When the wheel is actuated by the steering mechanism, therefore, the knuckle 11 and the sub-knuckle member 31 are rotated around the steering axis 10 as the center and, at the same time, the upper terminal part 33 of the sub-knuckle member 31 is pushed outwardly. As a result, the lower terminal 32 of the sub-knuckle member 31 is swung inwardly around the ball joint 24 as the center. The principle of the operation described above is depicted in FIG. 13(A). When the knuckle 11 is rotated around the steering axis 10 as illustrated in the diagram, the sub-knuckle member 31 is similarly subjected to a rotational force. Since the sub-knuckle member 31 is connected by the ball joint 54 to the control link 51, the rotational force causes the control link 51 to be displaced along the locus Q of the leading terminal of the control link 51. Consequently, the center of the ball joint 54 is pushed outside the automobile body B by the difference of distance between the arcuate locus R having the distance E of the offset as the radius and the locus Q mentioned above. As a result, the sub-knuckle member 31 is rotated around the steering axis 10 as the center and meanwhile swung around the ball joint 44 as the center as indicated by an arrow 35 in FIG. 1. At the same time, the knuckle 11 is swung around the ball joint 24 as the center in the direction indicated by an arrow 18. The camber angle of the wheel W, therefore, is varied proportionately to the amount of steering.

A suspension spring (not shown) is interposed between the upper arm 41 and the automobile body B. The upper arm 41 is urged by a spring force tending the leading terminal thereof downwardly. Optionally, the lower arm 21 may be formed of an I type arm. In this case, for the purpose of ensuring fast attachment of the I type arm to the automobile body, it is desirable to have one of the terminals of the tension rod connected to the I type arm and the other terminal connected to the automobile body B through the medium of a bracket. Further, the attachment of the arms 21, 41 and the control link 51 to the automobile body may be effected through the medium of a frame instead of being directly joined to the automobile body. The suspension apparatus illustrated in FIG. 1 and FIG. 2, is so constructed that the wheel may be supported by the spindle 12. When the laterally opposite front wheels are to be driven as in an automobile body designed for front wheel drive, for example, a drive shaft is rotatably supported at the center of the knuckle 11 through the medium of a uniform speed joint and the front wheels are consequently driven by the drive shaft.

By the independent suspension apparatus constructed as described above, the wheel W is supported so fast against the external force exerted in the lateral direction of the automobile body B as to ensure the stability of motion of the automobile. When the wheel rides on a projection from the road surface, the position of the wheel W relative to the automobile body B is shifted upwardly. When the automobile body is rotated, the knuckle arm 13 causes the knuckle 11 and the sub-knuckle member 31 to be rotated about the steering axis 10 as the center which passes the center of the ball joint 24 of the lower arm 21 and the center of the ball joint 44 of the upper arm 41. When the sub-knuckle member 31 is set into rotation, since the center of the ball joint 54 is offset relative to the steering point 50, the sub-knuckle member 31 is swung around the ball joint 44 as the center and the knuckle 11 is rotated around the ball joint 24 as the center. Consequently, the camber angle is varied proportionately to the steering angle.

The characteristic of the camber angle γ during the steering operation is varied by the direction of an offset to be produced by the center of the ball joint 54 interconnecting the control link 51 and the sub-knuckle member 31 relative to the steering point 50. When the center of the ball joint 54 is set at the position indicated by a reference numeral 54b in FIG. 2, the center of the ball joint 54 is offset inwardly relative to the steering point 50.

Figure 3:
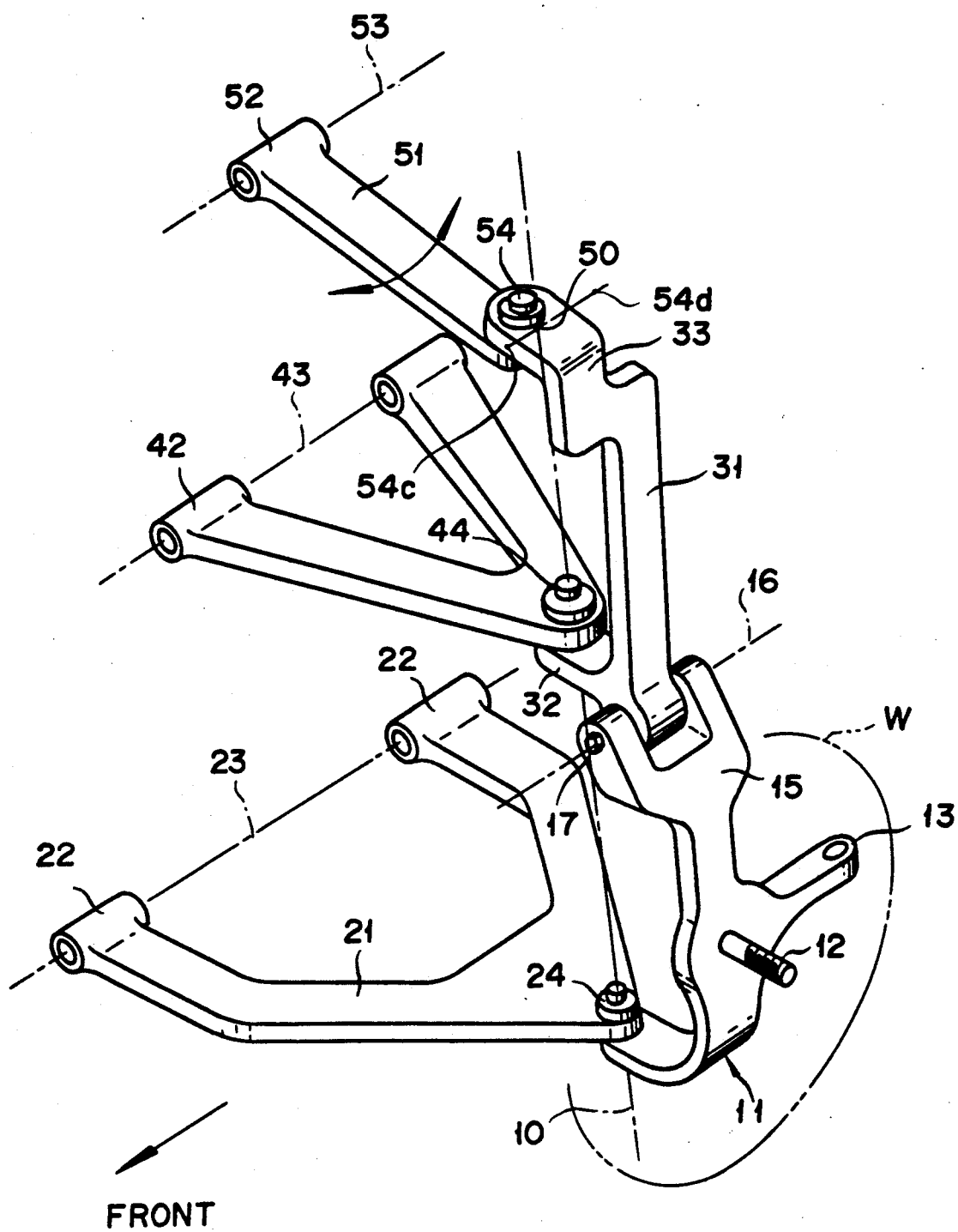
FIG. 3 is a perspective view of an independent suspension of another type as looked at in the same direction as in FIG. 1.
Figure 4:
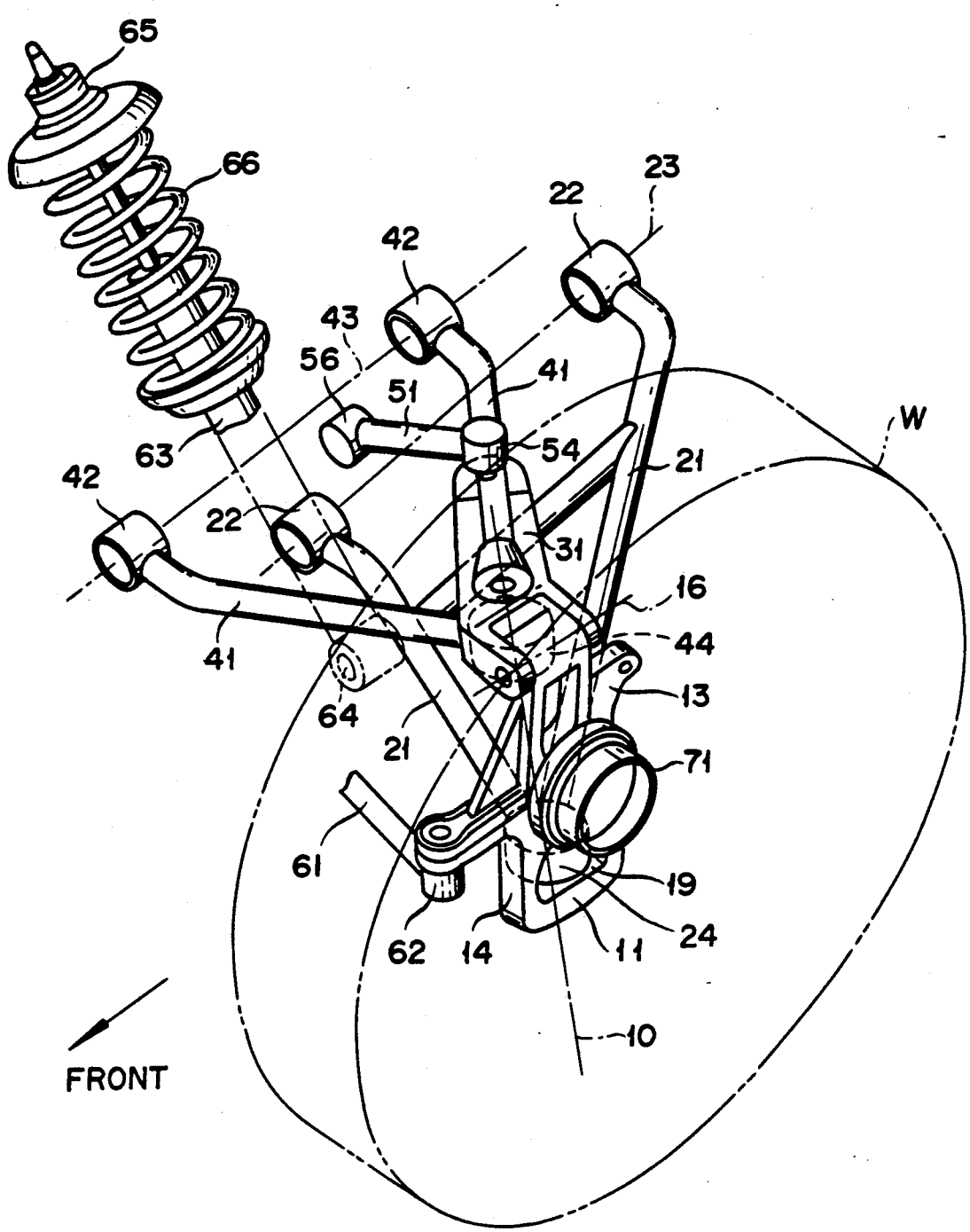
FIG. 4 is a perspective view illustrating an independent suspension of yet another type.
Figure 5:
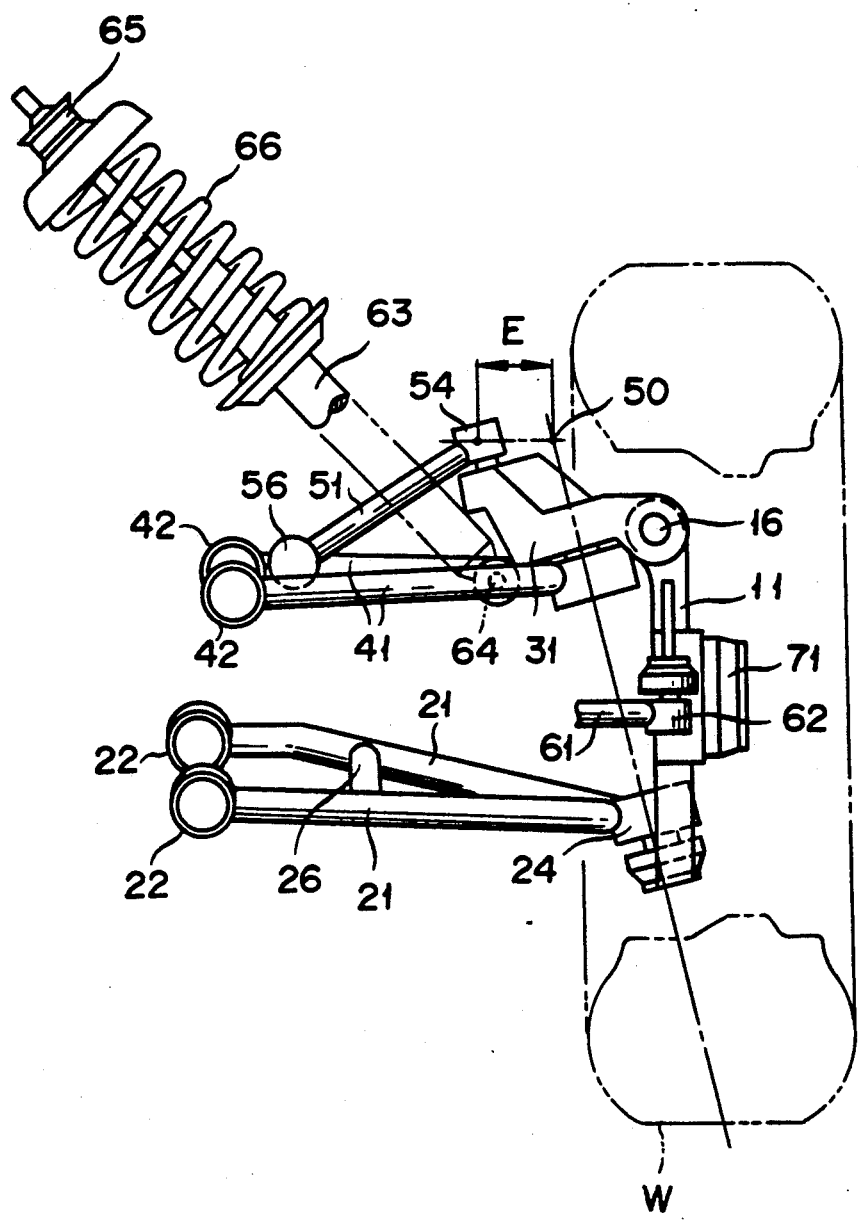
FIG. 5 is a front elevational view of the suspension of FIG. 4.

FIG. 3 is a diagram illustrating a suspension apparatus as another embodiment of this invention. In this suspension apparatus, the upper terminal part 33 of the sub-knuckle member 31 is bent forward and the center 54c of the ball joint 54 attached to the upper terminal part 33 is offset toward the front side of the automobile body relative to the steering point 50. In the suspension apparatus illustrated in FIG. 3, the members which correspond to the component members of the suspension apparatus described above are denoted by the same reference numerals. When the upper terminal part 33 of the sub-knuckle member 31 is folded backward, the center of the ball joint 54 is offset in the backward direction relative to the steering point 50 as indicated by a reference numeral 54d in FIG. 3.

The offset of the kind which the center of the ball joint 54 produces outwardly relative to the steering point 50 as illustrated in FIG. 1 and FIG. 2 is designated as an offset type A, the offset of the center produced inwardly is designated as an offset type B, the offset of the center produced forwardly is designated as an offset type C, and the offset of the center produced backwardly is designated as an offset type D. In these basic offset patterns, the directions of displacement of the center of the ball joint 54 during the steering operation are as shown respectively in FIG. 13(A) to (D). In these diagrams, the automobile body is depicted as being rotated toward the left, with the lefthand wheel WL constituting itself an inner wheel and the righthand wheel WR an outer wheel during the rotation.

In the suspension apparatus of the offset type A, the centers 54a of both the inner and outer wheels are shifted outwardly proportionately to the change in steering angle as described above. In the suspension apparatus of the offset type B, the centers 54b of both the inner and outer wheels are shifted inwardly proportionately to the change in steering angle. In the suspension apparatus of the offset type C, while the center 54c of the ball joint 54 of the outer wheel WR is shifted outwardly, the center of the inner wheel WL is shifted inwardly. Further, in the suspension apparatus of the offset type D, while the center 54d of the ball joint 54 of the outer wheel WR is shifted inwardly, the center 54d of the inner wheel WL is shifted outwardly. These offset types invariably constitute themselves the basic patterns which apply when the control link 51 is extended perpendicularly to the longitudinal direction of the automobile body.

Figure 6:
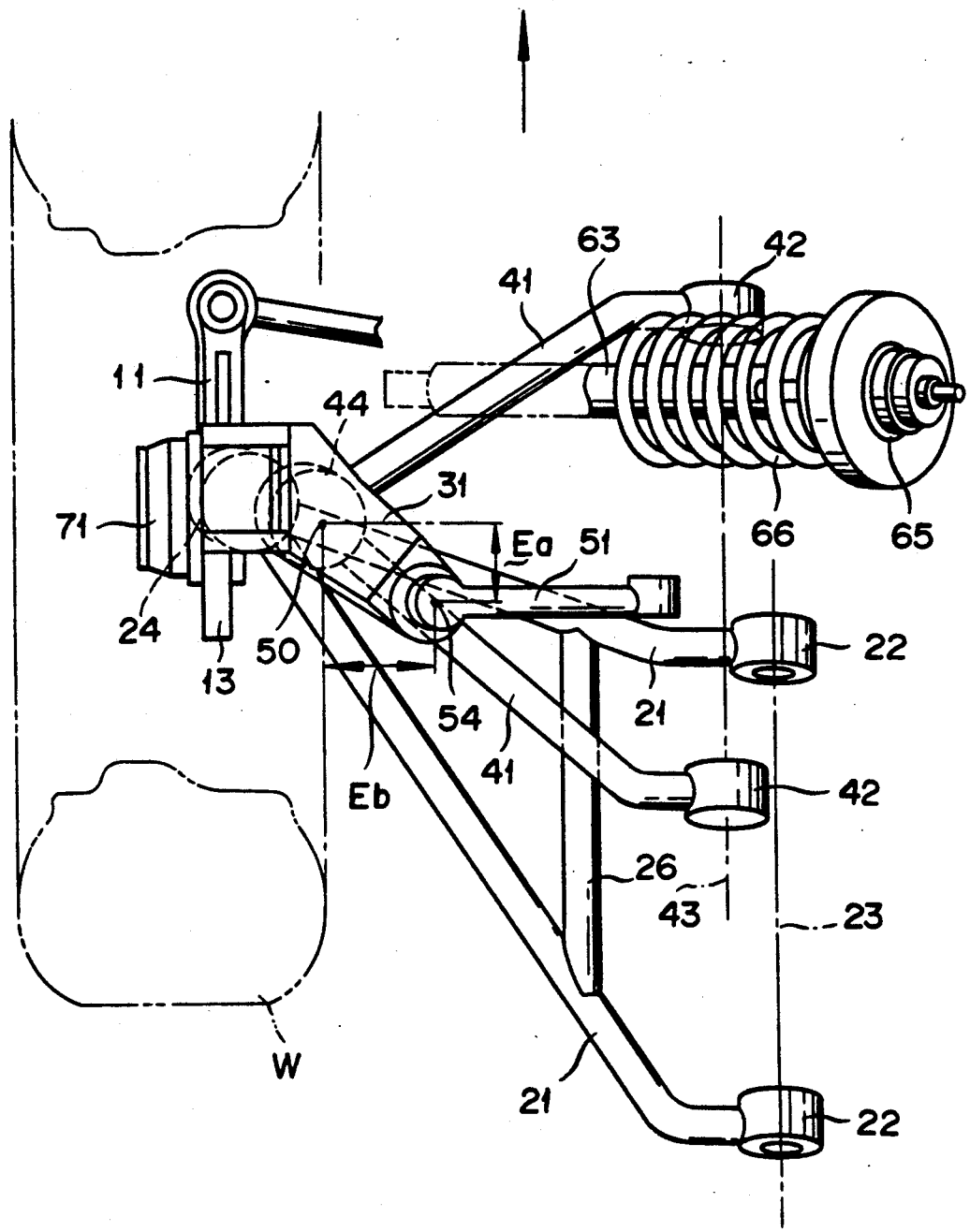
FIG. 6 is a plan view of the suspension of FIG. 4 and FIG. 5.
Figure 7:
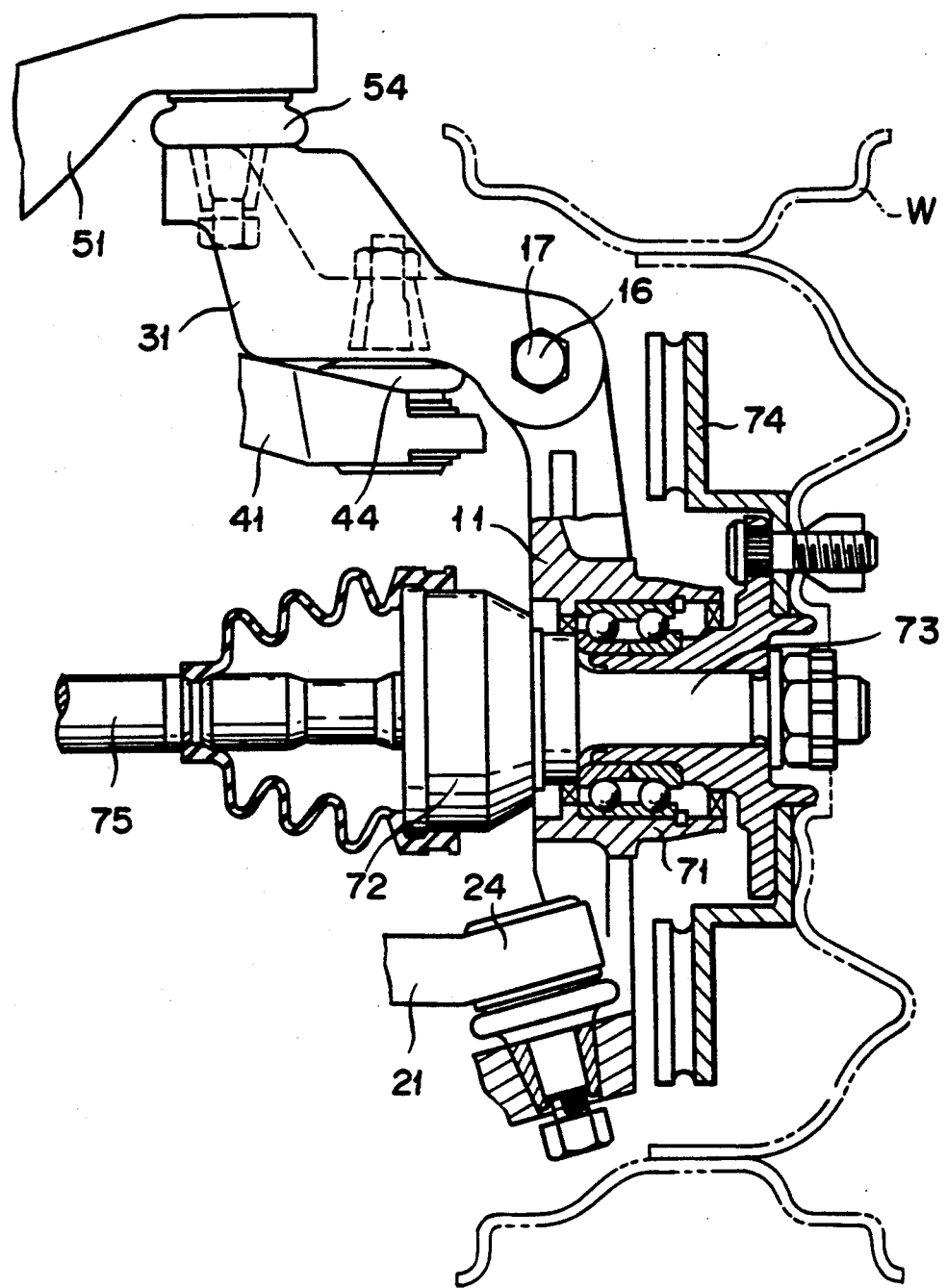
FIG. 7 is a cross section illustrating the essential part of the suspension of FIGS. 4 to 6.

In the actual suspension apparatus, there are times when the offset is produced in two directions. In the suspension apparatus illustrated in FIGS. 4 to 7, for example, the center of the ball joint 54 is offset by the distance Ea toward the inside of the automobile body relative to the steering point 50 and, at the same time, offset by the distance Eb toward the rear side. The lower arm 21 is integrally composed of two rods and a reinforcing member 26. The ball joint 24 attached to the leading terminal part of the lower arm 21 is positioned inside an accommodating space 19 formed in the lower terminal part 14 of the knuckle 11. The sub-knuckle member 31 is inclined inwardly and rearwardly during a straight motion of the automobile relative to the automobile body B as illustrated in FIG. 6 and FIG. 7. To the upper terminal of the sub-knuckle member 31, the control link 51 is connected through the medium of the ball joint 54. The upper arm 41 is connected to the sub-knuckle member 31 through the medium of the ball joint 44 which is positioned below the ball joint 54. The center of the ball joint 44 is positioned below the connecting axis 16. The basal terminal part of the control link 51 is connected to the automobile body B by the ball joint 56.

A tie rod 61 is connected to the knuckle 11 through the medium of a ball joint 62. The knuckle 11 is connected to the knuckle of the righthand wheel through the medium of the tie rod 61, the steering rod (omitted from illustration), and the tie rod of the righthand wheel. A shock absorber 63 is supported on the upper arm 41 through the medium of a pivot 64. A suspension spring 66 is mounted as interposed between a mounting part 65 and the shock absorber 63. The mounting part 65 is fixed on the automobile body. An output shaft 73 of a joint 72 is rotatably supported on a cylindrical part 71 formed on the knuckle 11. To this output shaft 73 are attached a brake disc 74 and the wheel W. A drive shaft 75 is connected to the joint 72.

In the suspension apparatus illustrated in FIG. 1 and FIG. 2, the control link 51 is positioned above the upper arm 41 and the third ball joint 54 is positioned above the second ball joint 44. Moreover, the second ball joint 44 is positioned at a level higher than the connecting axis 16. The array type of this nature will be referred to as an array type 1. In the suspension apparatus which is both the offset type A and the array type 1 as indicated in Table 1, both the inner and outer wheels WL and WR assume negative camber angles relative to the automobile body B during the steering operation. FIG. 3 depicts the apparatus of the array type 1 and the offset type C. During the steering operation, the outer wheel WR produces a negative change and the inner wheel WL a positive change respectively in the camber angle during the steering operation as shown in Table 1. In the other offset types of the array type 1, the changes in camber angle are as shown in Table 1.

Figure 8:
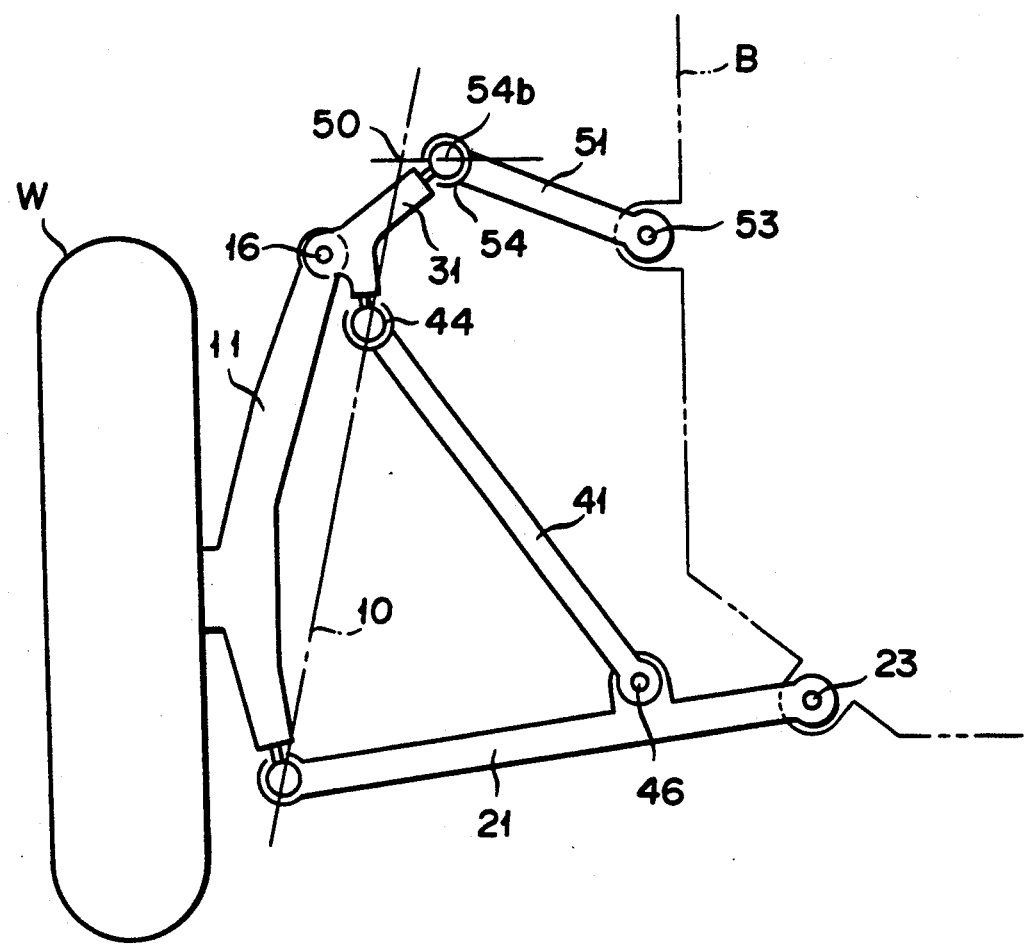
FIG. 8 is a schematic diagram of a modified version of the independent suspension as viewed in the same direction as in FIG. 2.

FIG. 8 depicts a suspension apparatus which is constructed in the array type 2 for the offset type B. In the suspension apparatus of the array type 2, similarly to that of the array time 1, the control link 51 is positioned above the upper arm 41 and the connecting axis 16 is positioned above the second ball joint 44. Since this suspension apparatus has the central point of the ball joint 54 fall on the inside relative to the steering point 50, it is of the offset type B. The characteristic of change in the camber angle produced by this suspension apparatus during the steering operation, therefore, is negative for both the inner and outer wheels as shown in Table 1. In the suspension apparatus illustrated in FIG. 8, the basal terminal part of the upper arm 41 is pivotally supported near the basal terminal part of the lower arm 21 through the medium of a pin 46. Optionally, the basal terminal part of this upper arm 41 may be pivotally supported directly on the automobile body B.

Figure 9:
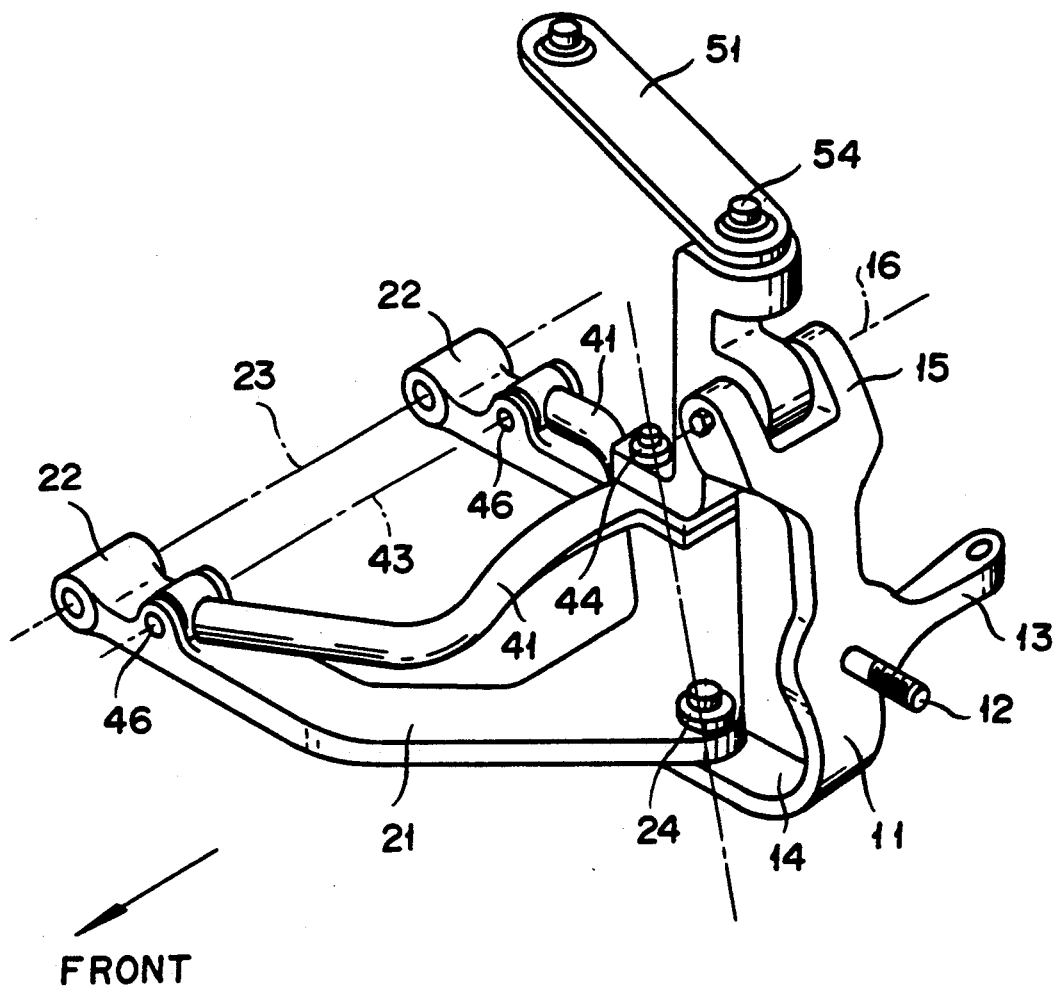
FIG. 9 is a perspective view illustrating an independent suspension as another modified version.

The suspension apparatus of the array type 2 is transformed into the suspension apparatus of the offset type A when the center of the ball joint 54 is offset outwardly relative to the steering point 50 as illustrated in FIG. 9. In this suspension apparatus, similarly to the apparatus illustrated in FIG. 8, the upper arm 41 is pivotally supported near the basal terminal part of the lower arm and the camber angle during the steering operation is positive both for the inner and outer wheels as shown in Table 1. The characteristics of change of camber angle γ in the suspension apparatuses of varying offset types constructed invariably in the array type 2 are as shown in Table 1.

Figure 10:
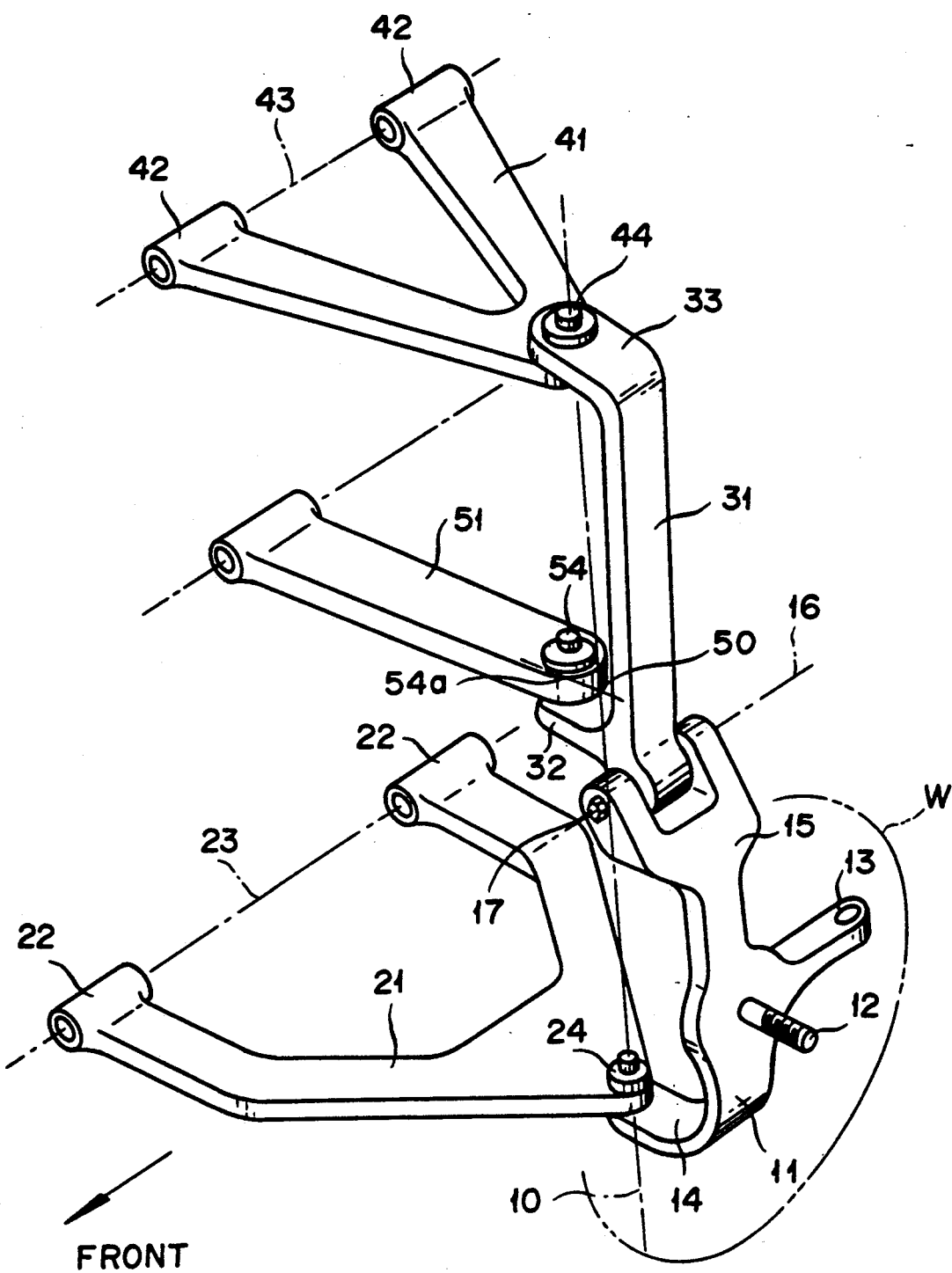
FIG. 10 is a perspective view illustrating an independent suspension as yet another modified version.

FIG. 10 is a diagram illustrating a suspension apparatus as yet another embodiment of this invention. Since the control link 51 is disposed below the upper arm 41 and the connecting axis is disposed below the second ball joint 44, this suspension apparatus belongs to the array type 3 indicated in Table 1. Since the suspension apparatus illustrated in FIG. 10 has the center 54b of the ball joint 54 positioned inwardly from the steering point 50, it belongs to the offset type B. Thus, the characteristic of camber angle is negative for both the inner and outer wheels as shown in Table 1. The characteristics of camber angle in the suspension apparatuses of the varying offset types constructed in the array type 3 are as shown in Table 1.

Figure 11:
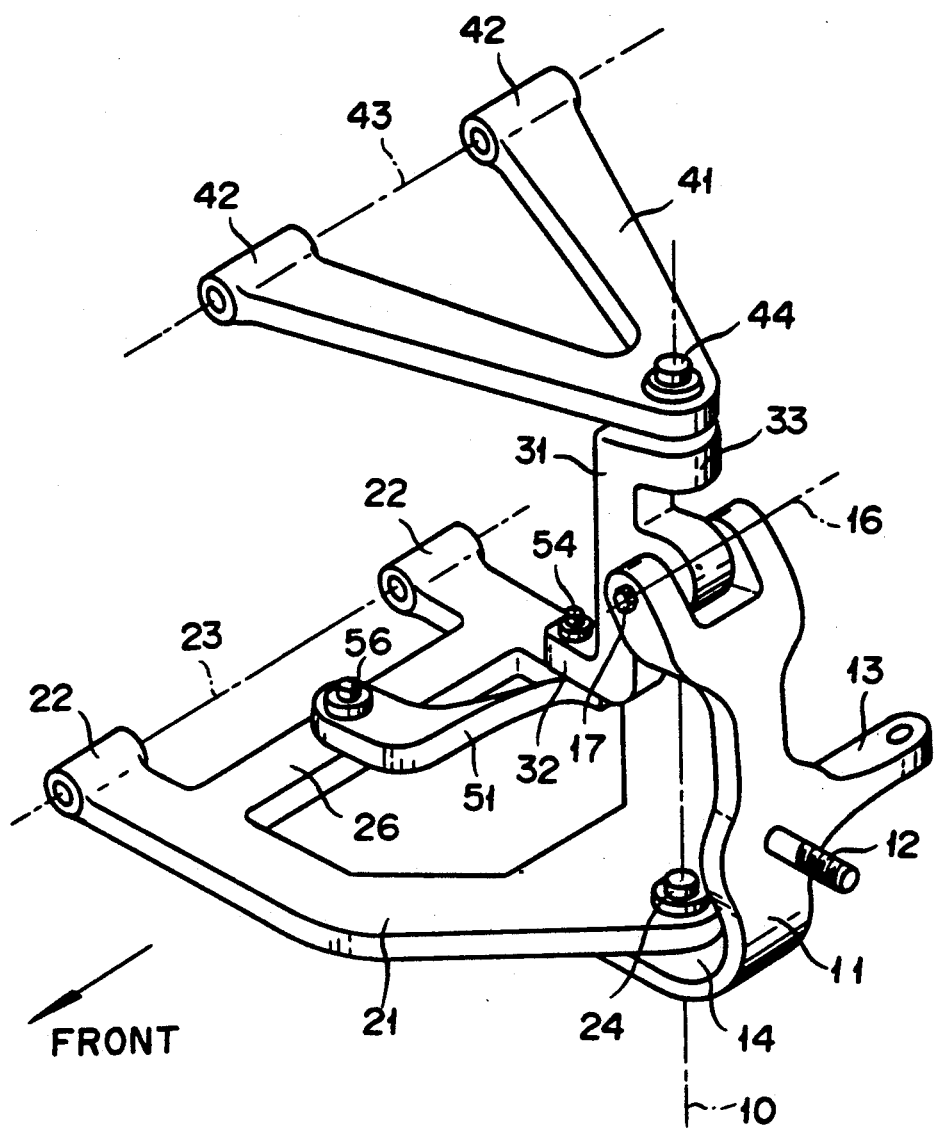
FIG. 11 is a perspective view illustrating an independent suspension as still another modified version.

FIG. 11 illustrates another suspension apparatus of the array type 3, belonging to the offset type B similarly to the suspension apparatus illustrated in FIG. 10. While the suspension apparatus illustrated in FIG. 10 has the connecting axis 16 positioned below the center of the third ball joint 54, the suspension apparatus of FIG. 11 has the connecting axis 16 positioned above the third ball joint 54. The characteristic of camber angle of this suspension apparatus is identical to that of the suspension apparatus of FIG. 10. Further, in this suspension apparatus, the basal terminal part of the control link 51 is connected to the reinforcing part 26 integrally formed in the basal terminal part of the lower arm 21 through the medium of a ball joint 56.

Figure 12:
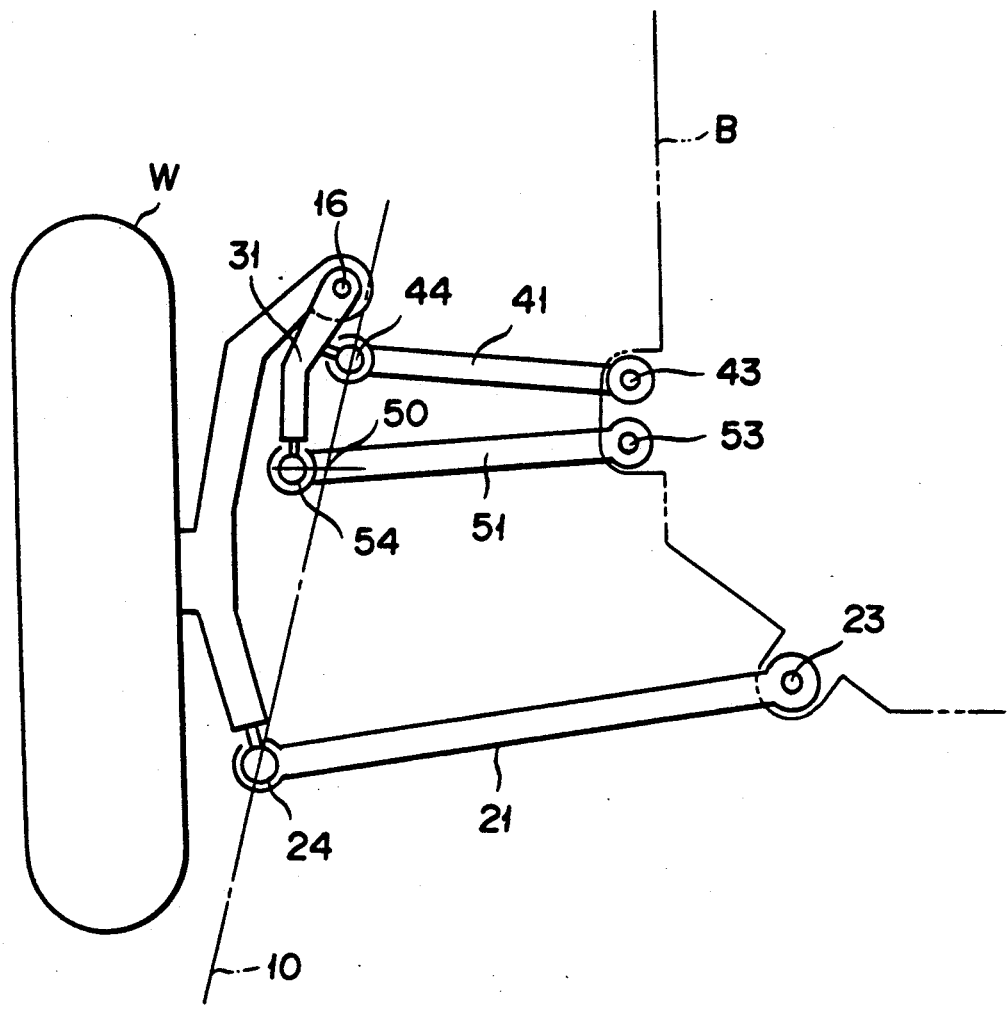
FIG. 12 is a schematic diagram illustrating an independent suspension as a further modified version.

When the control link 51 is positioned below the upper arm 41 and the connecting axis 16 is positioned above the second ball joint 44, the suspension apparatus belongs to the array type 4 indicated in Table 1. FIG. 12 is a diagram of a suspension apparatus of the array type 4. This apparatus belongs to the offset type A because the upper link 41 positioned below the connecting axis 16 is connected through the medium of the ball joint 44 to the upper terminal part of the sub-knuckle member 31 and the center of the ball joint 54 is positioned on the outer side of the steering point. The characteristic of camber angle is as shown in Table 1.

In this invention, the suspension apparatus can be obtained in two patterns, depending on the question as to which of the control link 51 and the upper arm 41 is positioned above the remainder. For each of these two patterns, a total of four array patterns are obtainable, depending on the vertical position of the connecting axis 16 relative to the second ball joint 44. These array patterns embrace the case in which the connecting axis 16 and the center of the ball joint 44 coincide with each other when the two wheels are turned in the direction of a straight motion. Invariably in these array patterns, the characteristic of change in the camber angle of the wheel relative to the automobile body during the steering operation can be set at any desired magnitude by freely setting the direction and distance of the offset of the center of the third ball joint 54 relative to the steering point.

Figure 14:
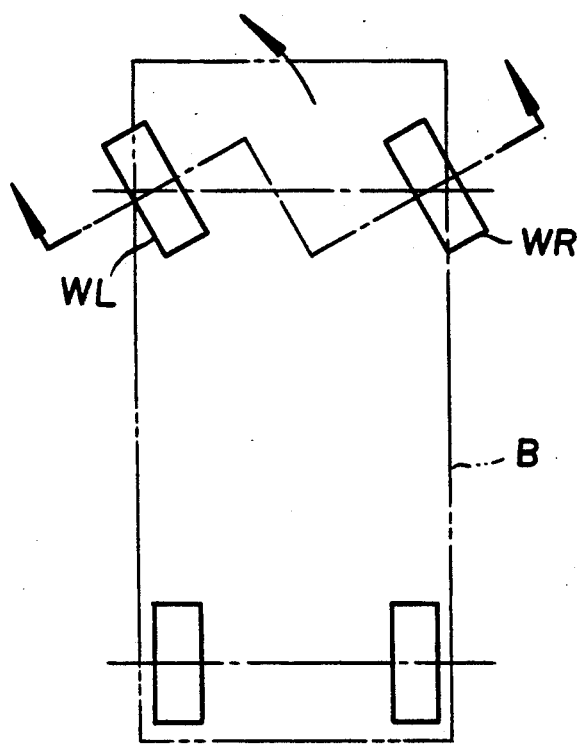
FIG. 14 is a plan view illustrating the state in which an automobile body using an independing suspension of this invention is in the process of rotation.
Figure 15:
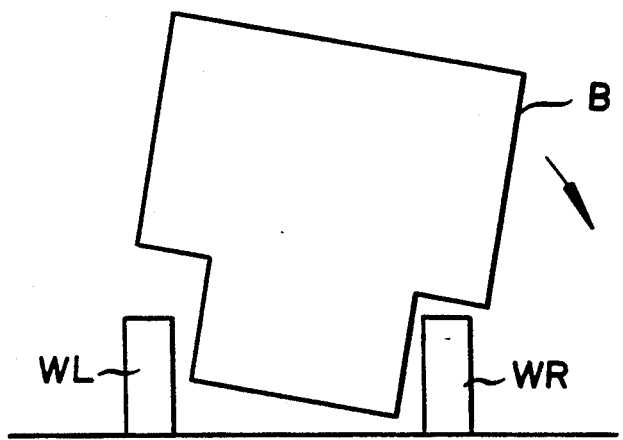
FIG. 15 is a cross section taken through FIG. 14 along the line of 15—15.

FIG. 14 is a plan view illustrating an automobile body in a state of being rotated to the left. The conditions of the left and right front wheels in this case are illustrated in FIG. 15. When the automobile body B is rotated to the left, it is rolled in the direction indicated in FIG. 15. In the suspension apparatus illustrated in FIGS. 4 to 7, for example, the outer wheel WR assumes a negative camber angle relative to the automobile body B and the inner wheel a positive camber angle relative to the automobile body B during the steering operation. Thus, the wheels W retain a vertical posture relative to the ground surface even during the steering operation.

FIG. 16 is a graph showing the characteristics of camber angle of the suspension apparatuses of the types illustrated in FIGS. 4 to 7 determined in an experiment using a fixed castor angle and a fixed camber angle, as compared with those of the conventional independent suspension apparatuses. In the graph, the characteristics of camber angle of the suspensions of the type under discussion are indicated with a solid line and those of the conventional suspensions with a two-dot chain line. It is clearly noted from this graph that the left and right front wheels assume a camber angle in the proximity of 0 degree relative to the automobile body B during the steering operation and that the outer wheel assumes a negative camber angle and the inner wheel a positive camber angle during the rotation. Heretofore, for the purpose of setting the camber angle of the outer wheel at a negative magnitude during the rotation, both the two front wheels are suffered to assume a negative camber angle while the automobile is in a straight motion, namely when the steering angle is zero. In the suspension of the embodiment illustrated in the diagram, the camber angle is zero when the steering angle is zero and the camber angles of the inner and outer front wheels are changed substantially symmetrically in proportion to the change in the steering angle.

While this invention has been illustrated and described in accordance with a preferred embodiments, it is recognized that variations and changes may be made and equivalents employed herein without departing from the invention as set forth in the claims.

TABLE 1

| | ARRAY TYPE | | | |
|---|---|---|---|---|
| | (1) CONTROL LINK 51 IS POSITIONED ABOVE UPPER ARM 41 | (2) | (3) CONTROL LINK 51 IS POSITIONED BELOW UPPER ARM 41 | (4) |
| OFFSET TYPE | CONNECTING AXIS 16 IS POSITIONED BELOW JOINT 44 | CONNECTING AXIS 16 IS POSITIONED ABOVE JOINT 44 | CONNECTING AXIS 16 IS POSITIONED BELOW JOINT 44 | CONNECTING AXIS 16 IS POSITIONED ABOVE JOINT 44 |
| (A) OUTER WHEEL | NEGATIVE | POSITIVE | POSITIVE | NEGATIVE |
| INNER WHEEL | NEGATIVE | POSITIVE | POSITIVE | NEGATIVE |
| (B) OUTER WHEEL | POSITIVE | NEGATIVE | NEGATIVE | POSITIVE |
| INNER WHEEL | POSITIVE | NEGATIVE | NEGATIVE | POSITIVE |
| (C) OUTER WHEEL | NEGATIVE | POSITIVE | POSITIVE | NEGATIVE |
| INNER WHEEL | POSITIVE | NEGATIVE | NEGATIVE | POSITIVE |

TABLE 1-continued

| | ARRAY TYPE | | | |
|---|---|---|---|---|
| | (1) CONTROL LINK 51 IS POSITIONED ABOVE UPPER ARM 41 | | (3) CONTROL LINK 51 IS POSITIONED BELOW UPPER ARM 41 | (4) |
| OFFSET TYPE | (1) CONNECTING AXIS 16 IS POSITIONED BELOW JOINT 44 | (2) CONNECTING AXIS 16 IS POSITIONED ABOVE JOINT 44 | (3) CONNECTING AXIS 16 IS POSITIONED BELOW JOINT 44 | (4) CONNECTING AXIS 16 IS POSITIONED ABOVE JOINT 44 |
| (D) OUTER WHEEL INNER WHEEL | POSITIVE NEGATIVE | NEGATIVE POSITIVE | NEGATIVE POSITIVE | POSITIVE NEGATIVE |

What is claimed is:

1. An independent suspension apparatus, comprising a knuckle for rotatably supporting a wheel thereon, a lower arm having a leading terminal part thereof connected to a lower terminal part of said knuckle through a first ball joint and a basal terminal part thereof attached to an automobile body, a sub-knuckle member pivotally supported on an upper terminal part of said knuckle through a pin extended in the longitudinal direction of said automobile body, an upper arm having a leading terminal part thereof connected to said sub-knuckle member through a second ball joint and a basal terminal part thereof attached to said automobile body and positioned above said lower arm, and a control link having a leading terminal part thereof connected to said sub-knuckle member through a third ball joint and a basal terminal part thereof attached to said automobile body, whereby an axis passing the center of said first ball joint and the center of said second ball joint constitutes itself a steering axis of said knuckle while said wheel is producing a steering motion and the leading terminal parts of said lower arm, said upper arm, and said control link are enabled to rotate in the vertical directions while said wheel is in motion in the vertical direction.

2. An independent suspension apparatus according to claim 1, wherein the basal terminal part of said upper arm is pivotally supported by said lower arm and pivotally supported by said automobile body through said lower arm.

3. An independent suspension apparatus according to claim 1, wherein the basal terminal part of said control link is attached to the basal terminal part of said lower arm and the basal terminal part of said control link is pivotally supported on said automobile body through said lower arm.

4. An independent suspension apparatus according to claim 1, wherein the center of said third ball joint is offset relative to the steering point constituting the point of intersection between a horizontal plane passing the center of said third ball joint interconnecting said sub-knuckle member and said control link and said steering axis and, whereby, the rotational motions produced around said steering axis by said knuckle and said sub-knuckle member while said automobile is being steered are transformed via a swinging motion of said sub-knuckle member around said second ball joint as the center into a swinging motion of said knuckle around said first ball joint as the center.

5. An independent suspension apparatus according to claim 4, wherein said offset of the center of said third ball joint relative to said steering point occurs inwardly relative to said steering point.

6. An independent suspension apparatus according to claim 1, wherein the leading terminal part of said control link is connected to the upper terminal part of said sub-knuckle member and the leading terminal part of said upper arm is connected to the part of said sub-knuckle member under the leading terminal part of said control link.

7. An independent suspension apparatus according to claim 1, wherein said knuckle member and said sub-knuckle member mutually rotate about a connecting axis, the center of said second ball joint interconnecting said upper arm and said sub-knuckle member is set at a level above said connecting axis.

8. An independent suspension apparatus according to claim 6, wherein said knuckle member and said sub-knuckle member mutually rotate about a connecting axis, the center of said second ball joint interconnecting said upper arm and said sub-knuckle member is set at a level below said connecting axis.

9. An independent suspension apparatus according to claim 1, wherein the leading terminal part of said control link is connected to a lower terminal part of said sub-knuckle member and the leading terminal part of said upper arm is connected to the part of said sub-knuckle member above the leading terminal part of said control link.

10. An independent suspension apparatus according to claim 9, wherein said knuckle member and said sub-knuckle member mutually rotate about a connecting axis, the center of said second ball joint interconnecting said upper arm and said sub-knuckle member is set at a level above said connecting axis.

11. An independent suspension apparatus according to claim 9, wherein said knuckle member and said sub-knuckle member mutually rotate about a connecting axis, the center of said second ball joint interconnecting said upper arm and said sub-knuckle member is set at a level below said connecting axis.

12. An independent suspension apparatus, comprising a knuckle for rotatably supporting a wheel thereon, a sub-knuckle member pivotally supported on an upper terminal part of said knuckle through a pin extended in the longitudinal direction of an automobile body to swing freely relative to said knuckle, a lower arm connected to said knuckle through a first ball joint to attach said knuckle vertically rotatably to said automobile body, an upper arm connected to said sub-knuckle member through a second ball joint to attach said sub-knuckle member vertically rotatably to said automobile body, and a control link connected to said sub-knuckle member through a third ball joint having the center thereof at a position parted from a steering axis formed by the center of said first ball joint and the center of said second ball joint to attach said sub-knuckle member vertically rotatably to said automobile body, whereby said third ball joint is offset in the horizontal direction when said knuckle and said sub-knuckle member are rotated around said steering axis while said automobile is being steered and said knuckle and said sub-knuckle member are relatively swung around said pin to change the camber angle while said automobile is being steered.

13. The independent suspension apparatus according to claim 4, wherein said offset of the center of said third ball joint relative to said steering point occurs outwardly relative to said steering point.

14. The independent suspension apparatus according to claim 4, wherein said offset of the center of said third ball joint relative to said steering point occurs forwardly relative to said steering point.

15. The independent suspension apparatus according to claim 4, wherein said offset of the center of said third ball joint relative to said steering point occurs rearwardly relative to said steering point.

* * * * *